3,206,442
PROCESSES FOR POLYMERIZING ALPHA-HALOTHIONOPHOSPHINIC HALIDES
Leo C. D. Groenweghe, St. Louis, Mo., assignor to Monsanto Company, a corporation of Delaware
No Drawing. Original application Oct. 1, 1959, Ser. No. 843,619. Divided and this application Mar. 9, 1962, Ser. No. 178,555
12 Claims. (Cl. 260—79)

This invention relates to a novel class of compounds of phosphorus. More specifically, this invention relates to certain secondary thionophosphonic halides (also known as thionophosphinic halides), which are particularly useful as monomers for polymerization to form inorganic polymers. The present patent application is a division of United States application Serial No. 843,619, filed October 1, 1959, now abandoned.

The foregoing novel class of phosphorus compounds are $\alpha$-halothionophosphinic halides, represented by the following formula:

wherein R' is an $\alpha$-halo organic radical bonded to the phosphorus atom through a carbon-phosphorus bond, R is an organic radical bonded to the phosphorus atom through a carbon-phosphorus bond, and X is a halogen atom, and especially a chlorine, bromine, or fluorine atom. Representative specific compounds of the foregoing class are ethylchloromethylthionophosphinic chloride; phenylchloromethylthionophosphinic chloride; di($\alpha$-chloroethyl)-thionophosphinic chloride; ethyl, $\alpha$-fluorocyclohexylthionophosphinic fluoride; benzyl, $\alpha$-bromobenzylthionophosphinic bromide; phenyl, $\alpha$ - chloro-n-dodecylthionophosphinic chloride; allyl($\alpha$-hydroxy-$\alpha$ - bromopropyl)thionophosphinic fluoride; 2 - ethylhexyl($\alpha$-iodo-$\alpha$-methoxypropyl)thionophosphinic bromide; p-chlorophenyl, $\alpha$-fluorophenethylthionophosphinic fluoride; p-hydroxyphenyl, $\alpha$-chloro-n-octylthionophosphinic chloride; t-butyl($\alpha$-chloro-3-furyl)thionophosphinic chloride; bromomethy($\beta$-cyanoethoxymethyl)thionophosphinic bromide; and trifluoromethyl - chloromethylthionophosphinic chloride. From the foregoing, it will be readily observed that R' is preferably selected from the group consisting of $\alpha$-halo benzyl radicals and $\alpha$-halo alkyl and $\alpha$-halo, monohydroxy-substituted alkyl radicals containing from 1 to 12 carbon atoms, and R is preferably either a benzyl radical, a phenyl radical, a p-halogenated phenyl radical, a p-hydroxy phenyl radical, or an alkyl or halogen-substituted alkyl radical containing from 1 to 8 carbon atoms.

The compounds of this invention can be readily prepared, for example, by an oxygen-sulfur interchange reaction between (a) such readily available thionophosphorus compounds as thiophosphoryltrichloride or phosphorus pentasulfide and (b) the oxygen analogues corresponding to the desired compounds. Such a preparation is illustrated by the following example:

EXAMPLE

*Preparation of methylchloromethylthionophosphinic chloride*

A mixture of 339 grams of PSCl$_3$ and 147 grams of CH$_3$(CH$_2$Cl)P(O)Cl, along with 7 grams of PCl$_3$ and 5 grams of AlCl$_3$ for catalysis, was placed in a 500 milliliter flask equipped with a distillation column and reflux condenser. The mixture was heated at its boiling temperature (135°–145° C.) for about 38 hours, during which time the vapor reflux temperature was maintained between 105° and 115° C. by intermittently bleeding off the lightest fraction at the top of the distillation column. After the 38 hour reaction period, the remaining liquid was fractionally distilled under vacuum, recovering 64 grams of the desired compound, boiling between 68°–70° C. at 3–4 mm. Hg. The compound was a colorless viscous liquid having an index of refraction, $n_{25}{}^D$, of 1.568. The compound was also characterized by taking a quantitative nuclear magnetic resonance spectrum using fixed 16.2 megacycle radio frequency (resulting in a variable magnetic field of about 9395 gauss). The compound showed a chemical shift (from 85% H$_3$PO$_4$) of $-85$ p.p.m.$\pm 1$ p.p.m. The resonance peak had a lopsided, irregular split at the top and a shoulder on each side. The shoulders were of unequal height.

By a somewhat different preparation in which 4.9 grams of PSCl$_3$ and 4.2 grams of CH$_3$(CH$_2$Cl)P(O)Cl were heated together in a sealed glass tube at 150° C. for 70 hours, it was found that better than 80% conversion to $$CH_3(CH_2Cl)P(S)Cl$$

could be obtained without any catalyst.

Any of the other $\alpha$-halothionophosphinic halides of this invention can be prepared in a comparable manner. The coresponding oxygen analogues used as starting materials for such preparations can be prepared by conventional methods such as described in Kosolapoff, "Organophosphorus Compounds," John Wiley & Sons, Inc., New York (1950), pp. 61–3 and 73–4.

The compounds of this invention can also be prepared by well-known conventional procedures without having to first obtain the oxygen analogue. For such procedures see, for example, Kosolapoff, supra, pp. 68–9 and 75.

As indicated above, the novel compounds of this invention are particularly useful as monomers for the preparation of inorganic polymers. These monomers can be polymerized in various ways. For example, they can be polymerized with hydrogen sulfide to form

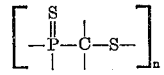

polymers. In this respect the compounds of this invention are uniquely different from the corresponding oxygen analogues, which decompose when treated with hydrogen sulfide in the same manner.

Another way in which the present $\alpha$-halothionophosphinic halides can be polymerized is by condensation with a metallic reducing agent, such as zinc or sodium, to form

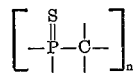

polymers. For example, by heating methylchloromethylthionophosphinic chloride and zinc dust together in a sealed tube for 50 hours at 150° C., the zinc will remove the chlorine atoms from the phosphorus atom and the $\alpha$-carbon atom and cause the monomeric molecules to link together through the positions from which the chlorine atoms were removed. In order to form high molecular weight polymers, the zinc/monomer ratio should approximate an equimolar ratio. Lower proportions of zinc will give lower molecular weight polymers. The reaction product will generally be a brittle mixture of the desired polymer and zinc chloride. This mixture can be ground and washed with water to dissolve the zinc chloride, leaving the polymeric product. These products are useful as thermoplastic molding resins having unusually good stability against thermal decomposition and hydrolysis.

As should be apparent from the above discussion, the $\alpha$-halo substituent on the compounds of this invention are important from the point of view of polymerization of the compounds in that the $\alpha$-halo substituent is sufficiently activated by the phosphorus atom to react with the polymerization agents (such as zinc or hydrogen sulfide). This is generally untrue with halogen atoms further removed from the phosphorus atom. With compounds containing only one α-halo substituent (such as in methylchloromethylthionophosphinic chloride), linear (i.e., non-branched) polymers will be formed. However, if the monomer contains two α-halo substituents, such as in di(chloromethyl)phosphinic chloride, then polymerization will yield cross-linked or branched polymers. These latter products will be more brittle and less soluble in most solvents than the linear polymers described above.

What is claimed is:

1. A process for manufacturing polymers having stability against thermal decomposition and hydrolysis, which process comprises intermixing under reactive conditions an α-halothionophosphinic halide having the structure

wherein R' is an α-halo organic radical bonded to the phosphorus atom through a carbon-phosphorus bond and is selected from the group consisting of α-halo benzyl radicals and α-halo alkyl and α-halo, monohydroxy-substituted alkyl radicals containing from 1 to 12 carbon atoms, R is bonded to the phosphorus atom through a carbon-phosphorus bond and is an organic radical selected from the group consisting of benzyl, phenyl, p-halo phenyl, and p-hydroxy phenyl radicals and halogen-substituted alkyl radicals and alkyl radicals containing from 1 to 8 carbon atoms, and X is a halogen atom; together with a metallic reducing agent selected from the group consisting of zinc and sodium.

2. A process as in claim 1 wherein said α-halothionophosphinic halide is a methylhalothionophosphinic halide.

3. A process as in claim 1, wherein said α-halothionophosphinic halide is an α-chlorothionophosphinic chloride.

4. A process as in claim 1, wherein said α-halothionophosphinic halide is a (monocyclic aryl) (α-haloalkyl) thionophosphinic halide wherein the monocyclic aryl portion is selected from the group consisting of phenyl, benzyl, p-chlorophenyl, and p-hydroxy phenyl radicals.

5. A process as in claim 1 wherein said α-halothionophosphinic halide is an alkyl-α-chloroalkylthionophosphinic chloride.

6. A process as in claim 5 wherein said alkyl-α-chloroalkylthionphosphinic chloride is methylchloromethylthionophosphinic chloride.

7. A process as in claim 5 wherein said alkyl-α-chloroalkylthionophosphinic chloride is ethylchloromethylthionophosphinic chloride.

8. A process as in claim 4 wherein said (monocyclic aryl) (α-haloalkyl)thionophosphinic halide is phenyl, α-chloro-n-dodecylthionophosphinic chloride.

9. A process as in claim 4 wherein said (monocyclic aryl) (α-haloalkyl)thionophosphinic halide is phenylchloromethylthionophosphinic chloride.

10. A process for manufacturing polymers, which process comprises heating a mixture of methylchloromethylthionophosphinic chlroide and zinc at an elevated temperature, and thereafter washing the resulting reaction product with water, the ratio of said zinc to said methylchloromethylthionophosphinic chloride in said mixture being at most equimolar.

11. A process for manufacturing high molecular weight polymers having stability against thermal decomposition and hydrolysis, which process comprises reacting together about equimolar proportions of methylchloromethylthionophosphinic chloride and zinc.

12. A process for manufacturing polymeric homocondensates of methylchloromethylthionophosphinic chloride, which process comprises heating a mixture of said methylchloromethylthionophosphinic chloride and up to an equimolar proportion, based on the amount of said methylchloromethylthionophosphinic chloride in said mixture of zinc, until said zinc reacts with said methylchloromethylthionophosphinic chloride, cooling to solidify the resulting reaction mixture, and washing said reaction mixture with water.

References Cited by the Examiner

UNITED STATES PATENTS 2,993,929   7/61   Rattenbury _____ 260—543
3,044,984   7/62   Bloomfield _____ 260—2

MURRAY TILLMAN, *Primary Examiner.*

JOSEPH R. LIBERMAN, *Examiner.*